March 10, 1970 — W. R. SWIFT — 3,499,376
REMOVABLE CASSETTE CAMERA WITH FILM SEVERING MECHANISM
Filed Feb. 13, 1967 — 3 Sheets-Sheet 1
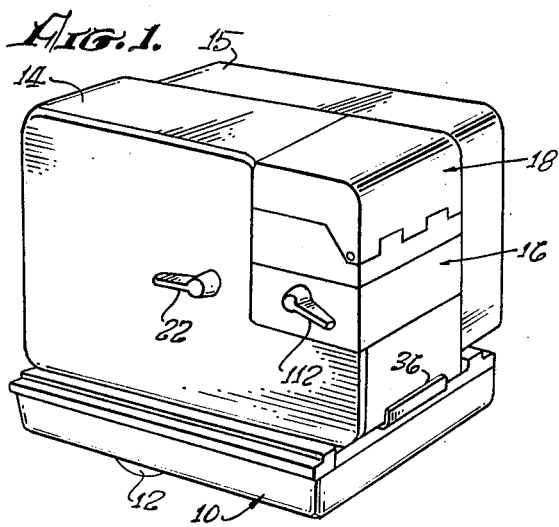
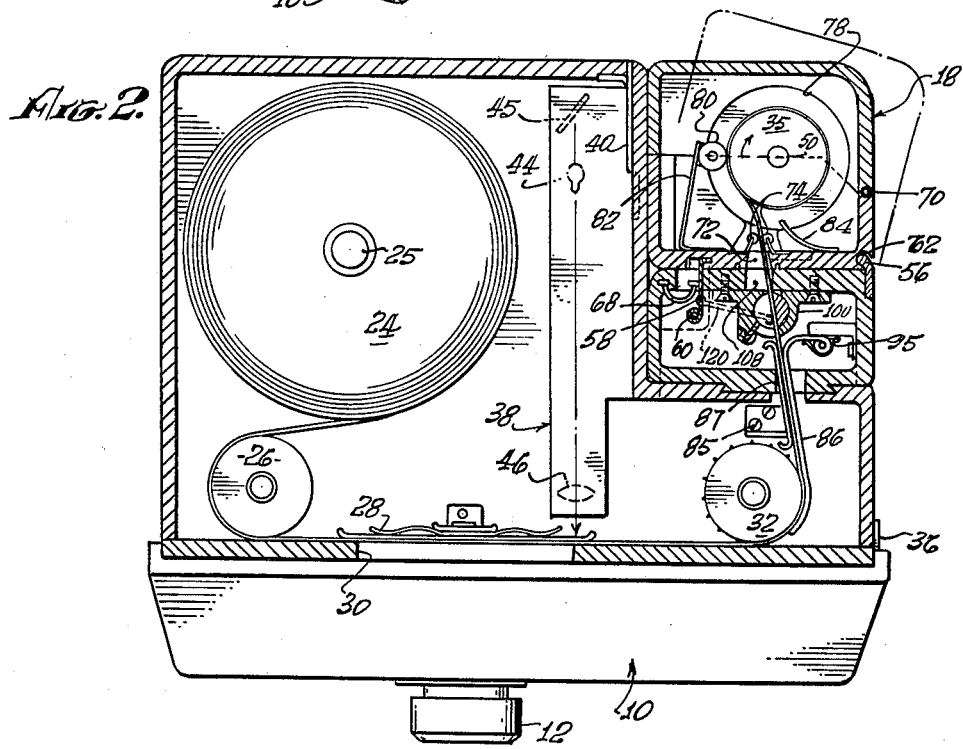
INVENTOR.
WILLIAM R. SWIFT,
BY Jas O M Roberts
ATTORNEY.

March 10, 1970        W. R. SWIFT        3,499,376
REMOVABLE CASSETTE CAMERA WITH FILM SEVERING MECHANISM
Filed Feb. 13, 1967        3 Sheets-Sheet 2
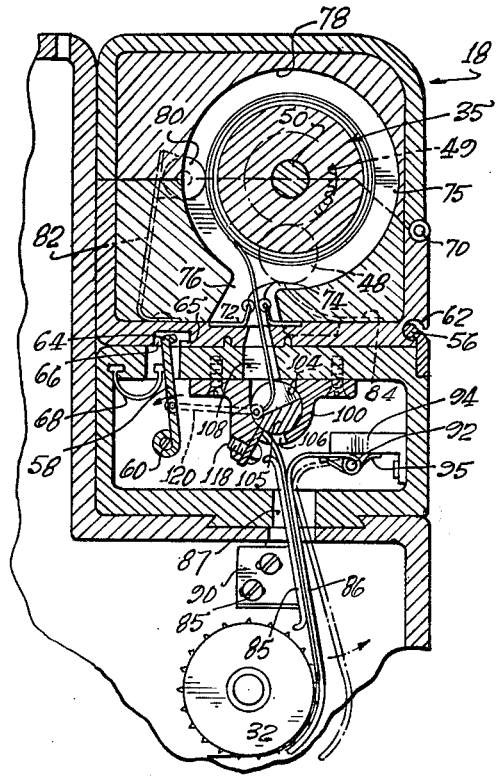
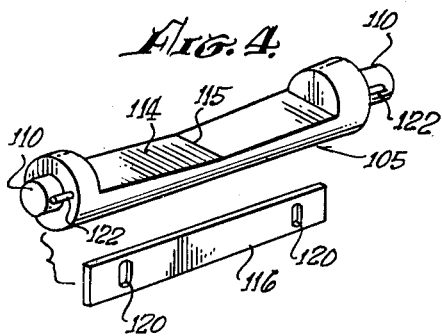
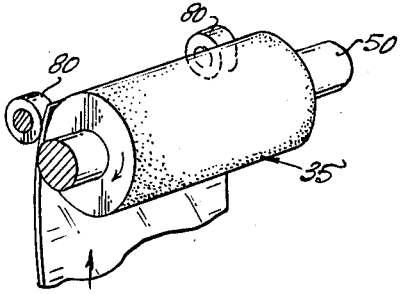
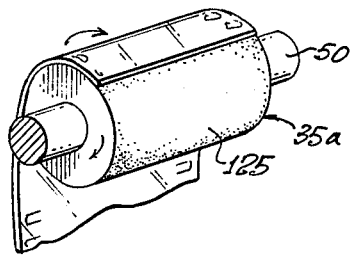
INVENTOR.
WILLIAM R. SWIFT,
By Jess M Roberts
ATTORNEY.

March 10, 1970 W. R. SWIFT 3,499,376
REMOVABLE CASSETTE CAMERA WITH FILM SEVERING MECHANISM
Filed Feb. 13, 1967 3 Sheets-Sheet 3
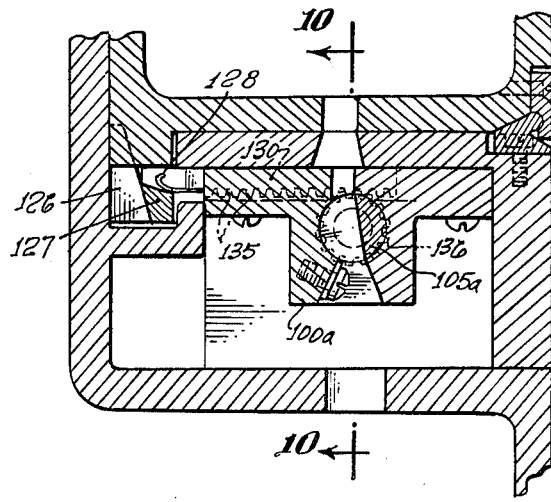
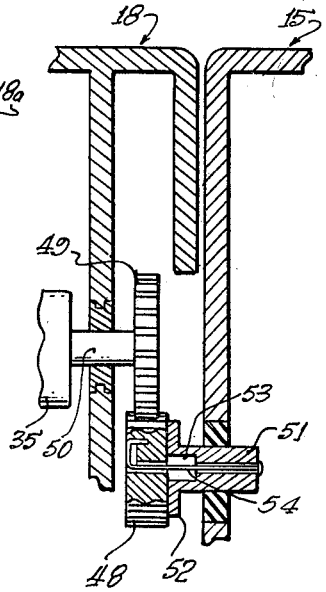
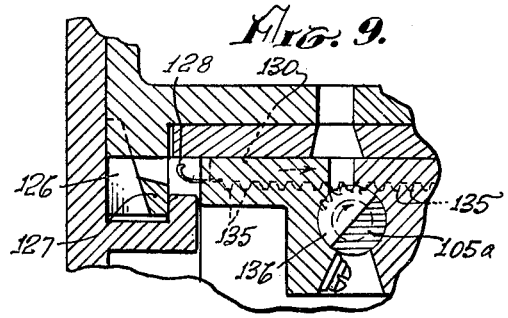
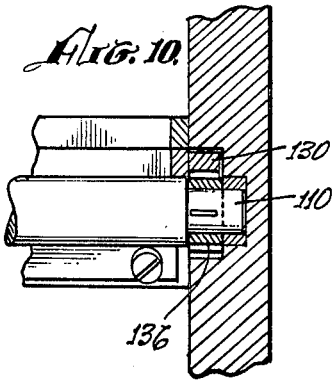
INVENTOR.
WILLIAM R. SWIFT,
By Jacob M. Roberts
ATTORNEY.

United States Patent Office 3,499,376
Patented Mar. 10, 1970

3,499,376
REMOVABLE CASSETTE CAMERA WITH FILM SEVERING MECHANISM
William R. Swift, Placenta, Calif., assignor to Coleman Engineering Company, Inc., Santa Ana, Calif., a corporation of California
Filed Feb. 13, 1967, Ser. No. 615,414
Int. Cl. G03b 19/04
U.S. Cl. 95—31   14 Claims

ABSTRACT OF THE DISCLOSURE

A camera having a removable cassette in which the exposed film is wound and having a built-in cutter to sever the exposed film to permit removal of the cassette from the camera body. A threading mechanism is also provided to thread the cut end of unexposed film into a new cassette.

BACKGROUND OF THE INVENTION

In the use of a camera employing roll film it is frequently desired to develop the exposed portion of the film without waiting until the whole roll is exposed. If a conventional camera is used the exposed film can be separated only by opening up the camera in a dark room for the purpose of cutting off the exposed film. A great deal of manipulation is required to remove the exposed portion of the film and to rewind the end of the unexposed film onto the take-up spool of the camera. There is always the possibility, moreover, that the film will be severed at the wrong place to result either in loss of a portion of the exposed film or in waste of a portion of the unexposed film.

The present invention solves the problem of so constructing a camera as to make possible a simple and expeditious procedure for removing the exposed film from the camera without resorting to a dark room. Included in this solution is the solution to the problem of providing a built-in film cutter and of providing a light-proof removable cassette for the exposed film. A still further problem that is met is to provide effective means for automatically threading the cut end of the unexposed film into a new cassette.

SUMMARY OF THE INVENTION

The exposed film passes through a light-proof exit from the camera housing into a light-proof entrance to a removable cassette. A built-in film cutter is operatively connected to a latch that normally anchors the cassette to the camera so that operation of the film cutter automatically releases the cassette containing the exposed film. Each of the interchangeable cassettes includes means to automatically thread the end of a film onto the take-up spool in the cassette and this feature is useful not only when an exposed portion of film is removed but also when a new film is threaded into the camera.

The invention provides a rotary film cutting blade that is operatively connected to the cassette latch by a suitable linkage. In this regard a feature of the invention is that the rotation of the blade to cut the film leaves the blade in a position to block leakage of light into the film exit of the camera. A further feature is the employment of a rack and gear mechanism for operatively connecting the rotary blade to the latch for releasably anchoring the cassette, the arrangement being such that the latch functions to press the cassette into its seat.

The self-threading of the film onto the take-up spool in the cassette is accomplished by means including means to guide the leading end of the film into a loose closed loop around the take-up spool and further including a coating on the take-up spool that has a high coefficient of friction with respect to the film. In one practice of the invention the take-up spool has a tacky pressure-sensitive adhesive coating to facilitate the self-threading action.

A further problem solved by the invention is to provide an efficient drive connection between the actuating mechanism in the camera and the take-up spool in the removable cassette. This problem is solved by employing a yieldingly mounted drive gear on the camera that meshes with a driven gear on the cassette, the yielding action of the drive gear making possible liberal tolerance without sacrificing driving efficiency.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a perspective view of the presently preferred embodiment of a camera incorporating the invention;

FIG. 2 is a view partly in side elevation and partly in section showing the film cutting mechanism in its normal position;

FIG. 3 is a fragmentary sectional view similar to FIG. 2 showing how the film cutting mechanism cuts the film and simultaneously not only seals off the interior of the camera against outside light but also unlatches the cassette for removal;

FIG. 4 is a perspective view of the two blades of the severing mechanism;

FIG. 5 shows how the advancing cut end of a film is engaged by a pair of idler rollers adjacent the periphery of the take-up spool;

FIG. 6 is a perspective view of a modified form of take-up spool the core of which has an adhesive coating to cause the advancing film end to releasably adhere to the spool;

FIG. 7 is a fragmentary sectional view showing how a gear that is permanently mounted on the take-up spool of the cassette makes operating engagement with a yieldingly mounted drive gear of the camera;

FIG. 8 is a fragmentary sectional view showing a modification in which a latch for the cassette is operated by the severing means through the medium of a rack and pinion, the latch being shown in its normal effective position;

FIG. 9 is a view similar to FIG. 8 showing the severing means in its second position with the latch retracted to free the cassette; and FIG. 10 is a fragmentary sectional view of the mechanism shown in FIGS. 8 and 9.

Referring to the drawings the present invention is embodied in a film magazine that is removably mounted in a film magazine that is removably mounted in a well known manner on a camera 10 having a lens 12. The film magazine comprises a film supply chamber 14, a chamber 15 that houses the film-driving mechanism, a film-cutting chamber 16 that houses the mechanism for severing the exposed portion of the film, and a removable cassette 18. The film supply chamber 14 has a removable side wall 20 which is normally secured by latch means (not shown) that is manually operable by an external handle 22.

In a well known manner a roll of film 24 is releasably keyed to a frictionally retarded spindle 25 and the film from the roll is guided to the focal plane of the magazine by a guide roller 26. At the focal plane a conventional pressure plate 28 spans the usual rectangular opening 30 in the magazine wall. From the focal plane the film travels to a drive sprocket 32 that engages sprocket holes in the film. The drive sprocket advances the film frame by frame and directs the film upward through the film-cutting chamber 16 into the interior of the cassette 18 where the exposed film is wound on a take-up spool 35. The film magazine is provided with the usual dark slide that may be manipulated by an external flange 36.

The film magazine may be provided with a data chamber 38 for printing indicia on the frames of the films in succession. In the construction shown a data card holder 40 is illuminated by a lamp 44 and the image of the data card is reflected by a mirror 45 through a lens 46 onto the film.

The film-driving mechanism in the chamber 15 actuates the drive sprocket 32 and additionally operates through the usual friction clutch (not shown) to actuate a drive gear 48 (FIG. 7) which meshes with a driven gear 49 on the shaft 50 of the take-up spool 35.

A feature of the invention is the manner in which the drive year 48 is yieldingly mounted on the end of a frictionally driven drive shaft 51. In the construction shown, the end of the drive shaft 51 is formed with a hub or radial flange 52 and the end of the drive shaft is further formed with an axial well 53. The drive gear 48 is mounted on drive shaft 51 in face-to-face abutment with the hub 52 by a resilient wire 54 that extends through the well 53 and is therefore free to flex as may be required to hold the drive gear in efficient mesh with the driven gear 49. In the construction shown, the wire 54 is effectively secured to the drive gear 48 by extending through a small axial bore therein with the end of the wire turned back into the drive gear as shown. Other means may be employed to mount the drive gear 51 on the wire 54 if desired. The fact that the drive gear 51 abuts the hub 52 keeps the drive gear in radial alignment with the driven gear 49 and the fact that the drive gear is yieldingly or floatingly supported by the wire 54 permits liberal tolerance in the spacing of the axis of the drive gear from the axis of the driven gear.

The cassette 18 may be removably mounted on the body of the film magazine in any suitable manner. In the construction shown in FIGS. 2 and 3, the cassette 18 is releasably secured by a retaining lip 56 in cooperation with a latch plate 58 that is swingably mounted on a pivot pin 60. The retaining lip 56 extends into a groove 62 of the cassette 18 in a manner that permits the cassette to rock about the lip as indicated by dotted lines in FIG. 2. The latch plate 58 is formed with a latching flange 64 which releasably engages a shoulder 65 in a second groove 66 in the bottom of the cassette. The latch plate 58 is suitably biased towards its latching position by a U-shaped spring 68.

The cassette 18 is adapted to be opened and closed in a well known manner and for this purpose is made in two sections which are normally latched together and which are interconnected by a hinge pin 70. The bottom wall of the cassette is provided with a slot 72 to serve as an entrance for the exposed film and the entrance is sealed against exterior light by suitable means such as a pair of small rollers 74 mounted on suitable leaf springs.

Each of the two opposite inner end walls of the cassette 18 is formed with a circular recess 75 concentric to the take-up spool 35 and an adjoining entrance recess 76 through which the film passes to the circular recess. The recesses 75 and 76 of the two end walls respectively are spaced apart just sufficiently to receive the width of the film and therefore the circular shoulders 78 of the two circular recesses 75 provide arcuate guide surfaces that cooperate with the opposite longitudinal edges of the film to confine the film to the region around the take-up spool 35.

In the preferred practice of the invention, the interior of the cassette 18 is further provided with a pair of idler rollers 80 (FIGS. 2 and 5) which are mounted on leaf spring arms 82 to engage opposite longitudinal margins of the film.

The preferred practice of the invention is further characterized by the concept of the cylindrical surface of the take-up spool being covered with a material having a relatively high coefficient of friction with respect to photographic film to minimize slippage between the spool and the film. For this purpose the cylindrical surface of the take-up spool may be formed by a layer of silicone rubber.

These various provisions inside the cassette 18 make the cassette self-threading in the sense that when an end of a strip of film is advanced into the cassette by the drive sprocket 32, the advancing film end is automatically engaged with the take-up spool. As the advancing film end enters the cassette through the entrance slot 72 it is guided by the two light-sealing blades 74 into the region of the periphery of the take-up spool 35. The advancing film end encounters the two idler rollers 80 which thrust the opposite longitudinal margins of the film against the take-up spool. The silicone rubber surface of the take-up spool is inherently tacky to a degree that tends to cause the leading edge of the film to cling to the peripheral surface of the spool as shown in FIG. 2, but in this embodiment of the invention sole reliance is not placed on the tackiness of the spool surface.

If the leading end of the film does not cling to the surface of the spool it is confined by the guide surfaces of the circular shoulders 78 and is thereby formed into a loop that loosely encloses the take-up spool. When the leading end of the film loop reaches a guide baffle 84 (FIG. 2) it is deflected upward by the guide baffle into the acute angle where the incoming film first makes contact with the takeup spool. As a result the leading end of the film is tucked under the newly arriving film to close the film loop. Once the leading end of the loose film loop is tucked under in this manner the loop may be tightened into effective engagement with the take-up spool. For the purpose of tightening the film loop, the take-up spool rotates at a peripheral speed that exceeds the peripheral speed of the drive sprocket 32 and the fact that the peripheral surface of the take-up spool is of a character to discourage slippage of the film promotes prompt tightening of the film around the spool. Once the leading end of the film is effectively wrapped around the take-up spool normal slippage occurs at the usual slip clutch (not shown) in the film-driving mechanism and, of course, the slippage increases as the amount of film increases on the take-up spool.

The film is guided into the film-cutting chamber by a pair of smooth surfaced guide plates 85 and 86 that extend through a slot 87. The guide plate 85 is fixedly but adjustably mounted by screws 88 that extend through slots in ears 90 of the plate and, as best shown in FIG. 3, the guide plate 86 extends into the film-cutting compartment where it is pivotally mounted on a hinge pin 92 on the underside of a fixed bracket 94. A suitable torque spring 95 biases the guide plate 86 to its normal guiding position and permits the guide plate to be retracted manually to facilitate the threading of the end of a new film between the two guide plates.

Inside the film-cutting chamber, a cutter housing 100 mounted on the top wall of the chamber by suitable screws provides a transverse cylindrical chamber 104 that is occupied by a rotary cutting element 105. The cylindrical chamber 104 has a slot entrance 106 for the film and on its opposite side communicates with a wide slot 108 in the wall of the film-cutting chamber through which the film enters the cassette 18.

The rotary cutting element 105 which is journaled by trunnions 110 and is operated by an external handle 112 (FIG. 1) is of the shape shown in FIG. 4. The rotary cutting element has a cutting face 114 that slopes from both ends to a relatively low midline 115 to provide a desirable degree of scissor action to shear the film. The rotary cutting element 105 cooperates with a fixed blade 116 which is adjustably mounted at the slot entrance 106 of the cutter housing 100 by screws 118 that extend through slots 120 of the blade element. The adjustable mounting of the blade 116 makes possible accurate positioning of the blade relative to the rotary cutting element 105 and further makes it possible to compensate for wear as needed.

At the normal rotary position of the rotary cutting element 105 shown in FIG. 2, the rotary cutting element clears the film to permit the film to travel to the take-up spool 35. Rotating the rotary cutting element 105 from the position shown in FIG. 2 to the position shown in FIG. 3 causes the cutting face 114 of the rotary cutting element to cooperate with the fixed blade element 116 to shear the film, the result being illustrated in FIG. 3. In FIG. 3 where the rotary cutting element 105 has been rotated approximately 90° to shear the film, it is important to note that the rotary cutting element completely seals off the slot entrance 106 to the cutter housing 100 so that the cassette 18 may be removed without any possibility of exterior light entering the film magazine through the film-cutting chamber 14.

As heretofore stated a feature of the invention is the concept of unlatching the cassette 18 in response to operation of the film-cutting mechanism. In the present embodiment of the invention this concept is carried out by providing each end of the rotary cutting element 105 with a short pin 122 for pivotal connection with one end of a corresponding link 124. The two links 124 at the opposite ends of the rotary cutting element are pivotally connected to the previously mentioned latch plate 58, the two pins 122 serving as crank pins to move the latch plate 58 to its release position in response to the film cutting operation.

The manner in which the invention serves its purpose may be readily understood from the foregoing description. To remove exposed film from the camera it is merely necessary to manipulate the handle 112, the result being severance of the film and simultaneous unlatching of the cassette 18. The unlatched cassette may be removed without permitting light to enter the film magazine by virtue of the light-sealing function of the rotary cutting element 105.

When an empty cassette is substituted for the removed cassette the manipulation of the handle 112 latches the empty cassette in place and at the same time returns the rotary cutting element 105 to its normal position to permit the newly cut film end to be driven through the film-cutting magazine into the cassette. When the film end enters the cassette it is automatically engaged with the take-up spool 35 in the manner heretofore described.

FIG. 6 shows a take-up spool 35a that may be substituted for the previously described take-up spool 35. The take-up spool 35a has a highly tacky surface that causes the advancing film end to adhere to the spool in response to light contact with the periphery of the spool. Preferably the highly tacky surface is provided by wrapping a tape or band 125 around the spool, the band being of a well known character with both inner and outer surface coatings of pressure-sensitive adhesive. The inner adhesive coating causes the tape or band to adhere to the periphery of the take-up spool and the outer adhesive coating serves the purpose of releasably bonding the leading cut end of the film to the spool.

FIGS. 8 to 10 illustrate a modified form of latch arrangement for the cassette. The cassette 18a in FIG. 8 is of the usual construction except for the provision of a tongue 126 that normally extends into the film-cutting chamber, the tongue being formed with an inclined latching shoulder 127. A longitudinally movable latch member 128 in the form of a curved leaf spring for cooperation with the latching shoulder 127 is slidable into and out of engagement with the latching shoulder. The leaf spring 128 is mounted on the end of a rack bar 130 that is formed with rack teeth 135. The rack teeth 135 are engaged by a pinion 136 that is keyed on one of the two trunnions 110 of the rotary cutting element 105a. Preferably there is a pinion 136 at each of the two ends of the rotary cutting element 105a and two corresponding latch members 128 that cooperate with two corresponding latch shoulders 127. To keep light from entering the film-cutting chamber when the cassette 18a is removed, an extension 138 of the cutter housing 100a is provided to serve as a light seal.

An important advantage of this second latching arrangement resides in the wedging action of the inclined coacting surfaces of the latch shoulders 127 and of the latch members 128 respectively. Thus the inclined shoulders 127 and the latch members 128 constitute cam means whereby the latching operation tightens the cassette against the wall of the film-cutting chamber to insure that no light enters between the cassette and the film-cutting chamber to fog the film as it enters the cassette.

My description in specific detail of the selected practices of the invention will suggest various changes, modifications and other departures from my disclosure within the spirit and scope of the appended claims.

I claim:

1. In a camera, the combination of:
means to hold a supply of film;
a take-up spool;
means to yieldingly drive the take-up spool at a given peripheral rate of travel;
means to guide the film along a path from the holding means to a focal plane for exposure of the film and from the focal plane to the take-up spool;
means incorporated in the camera to sever the film between the exposure plane and the take-up spool to separate the exposed film from the unexposed film, thereby to leave a cut film end inside the camera;
means to drive the film at a rate less than said given rate to advance said cut end of the film to the region of the take-up spool; and
guide means spaced radially of the spool and extending around at least a major portion of the spool to form the cut end of the film into a loop of larger diameter than the spool and to guide the end of the loop back onto the film approaching the spool thereby to cause the film loop to tighten into engagement with the spool,
the material of the surface of the spool having a high coefficient of friction with respect to the film to promote the tightening of the loop around the spool.

2. A combination as set forth in claim 1 in which the surface material of the take-up spool is a silicone rubber.

3. A combination as set forth in claim 1 in which said guide means comprises a pair of arcuate guide means to slidingly engage the opposite margins only of the cut film end.

4. A combination as set forth in claim 3 in which said take-up spool is tacky on its peripheral surface for adherence of the advancing cut film end to the take-up spool.

5. In a camera, the combination of:
means to hold a supply of film;
a cassette removably mounted on the camera,
said cassette having a take-up spool with a driven gear operatively connected thereto;
a film-driving mechanism incorporated in the camera including a drive gear positioned to releasably mesh with said driven gear when the cassette is on the camera,
one of said two gears being mounted on a resiliently flexible shaft means to yieldingly bias the one gear into mesh with the other of the two gears;
means to guide the film along a path from said holding means to a focal plane for exposure of the film and from the focal plane to the cassette; and
means incorporated in the camera to sever the film between the focal plane and the cassette to permit the cassette to be removed from the camera with the exposed portion of the film therein, thereby leaving a cut film end in the camera.

6. A combination as set forth in claim 5 which includes a member having a radial face in abutment with a side face of said one gear to maintain said one gear in radial alignment with said other gear, said member being operatively connected with said one gear for synchronous rotation therewith.

7. In a camera having means to hold a supply of film for exposure and a take-up spool to receive the exposed film, the improvement comprising:

said spool having a surface with a high coefficient of friction with respect to the film;

means to advance the film end toward the take-up spool in a direction generally tangential of the spool;

means to form the advancing film end into an open loop of substantially larger diameter than the spool enclosing the spool;

means to close the loop around the spool; and means to frictionally drive the spool at a greater peripheral speed than the rate of advance of the film end to tighten the closed loop around the spool.

8. A combination as set forth in claim 7 in which said means to form the advancing film end into an open loop includes fixed guide means for sliding engagement with the opposite margins only of the film end.

9. A combination as set forth in claim 8 which includes idler roller means yieldingly biased towards the take-up spool to press the advancing film end against the spool.

10. A combination as set forth in claim 7 in which said take-up spool has a pressure-sensitive adhesive surface.

11. In a camera, the combination of:

means to hold a supply of film;

a removable cassette having a driven take-up spool to hold the exposed film;

means to guide the film along a path from said holding means to a focal plane for exposure of the film and from the focal plane to the cassette;

means incorporated in the camera to sever the film between the focal plane and the cassette to permit the cassette to be removed from the camera with the exposed portion of the film therein, thereby leaving a cut film end in the camera; and means to removably attach the cassette to the camera, said attaching means including fixed means on the camera to hingedly engage the cassette and further including means to tighten the cassette against the camera to keep out light, said tightening means including rack and pinion means operable by the severing means.

12. In a camera, the combination of:

means to hold a supply of film;

a removable cassette having a driven take-up spool to hold the exposed film;

means to guide the film along a path from said holding means to a focal plane for exposure of the film and from the focal plane to the cassette;

a fixed blade inside the camera adjacent said path; and rotary cutting means of the configuration of a solid cylinder with a longitudinal side portion thereof removed to clear the path of the film to the take-up spool and to form a cutting edge to cooperate with said blade, said rotary cutting means being rotatable about the axis of the solid cylinder to cut the film and simultaneously to shut off said path in a light-proof manner, said cutting edge inclining from opposite longitudinal directions from high points at the opposite ends of the cutting edge to a low point centrally of the cutting edge to cause the cutting edge to cooperate with said fixed blade for progressive scissor action, 13. In a camera, the combination of:

means to hold a supply of film;

a cassette removably mounted on the body of the camera and having a driven take-up spool to hold exposed film and having a peripheral entrance for the film with means to seal the entrance against the admission of light;

a film-cutting chamber adjacent the removable cassette with a wall separating the film-cutting chamber from the removable cassette;

a passage for the film through said wall;

means to guide the film along a path from said holding means to a focal plane and from the focal plane through the film-cutting chamber and said passage to and through the entrance to the cassette;

a fixed blade in the passage;

a film-cutting means in said passage and spanning the passage and having a peripheral recess normally clearing the path of the film through the passage, said peripheral recess forming a peripheral cutting edge to cooperate with said blade to cut the film, said film-cutting means being rotatable from a normal position clearing the film to cut the film and to close the path against light;

means to latch the cassette to the camera and to prevent release of the latch while the film-cutting means is in its normal position; and means operatively connecting the latch to the film-cutting means for release of the latch in response to rotation of the film-cutting means out of its normal position, said operatively connecting means including a crank pin on the rotary film cutting means and a link connected to the crank pin.

14. In a camera, the combination of:

means to hold a supply of film;

a removable cassette having a driven take-up spool to hold the exposed film;

means to guide the film along a path from said holding means to a focal plane for exposure of the film and from the focal plane to the cassette;

means incorporated in the camera to sever the film between the focal plane and the cassette to permit the cassette to be removed from the camera with the exposed portion of the film therein, thereby leaving a cut film end in the camera; and means to removably attach the cassette to the camera, said attaching means including fixed means on the camera to hingedly engage the cassette and further including means to tighten the cassette against the camera to keep out light, said tightening means being responsive to the film-severing means to release the cassette in response to operation of the film-severing means, said film-severing means being a rotary blade and said tightening means including a rack and pinion means operable by rotation of the blade.

References Cited

UNITED STATES PATENTS

| | | |
|---|---|---|
| 2,520,799 | 8/1950 | Debrie. |
| 2,492,900 | 12/1949 | Swenson _____ 95—31 |
| 2,545,196 | 3/1951 | Curioni _____ 95—31 |
| 2,578,283 | 11/1951 | Bornemann et al. _____ 242—74 |
| 2,585,226 | 2/1952 | Christman _____ 242—74 |
| 3,030,045 | 4/1962 | Rehklau _____ 242—74 |

NORTON ANSHER, Primary Examiner

J. F. PETERS, JR., Assistant Examiner

U.S. Cl. X.R.

242—74; 352—72